July 25, 1933.  A. ANARETA  1,920,048
COMBINED TYPHOONOSCOPE AND BAROMETER
Filed Aug. 21, 1928   2 Sheets-Sheet 1
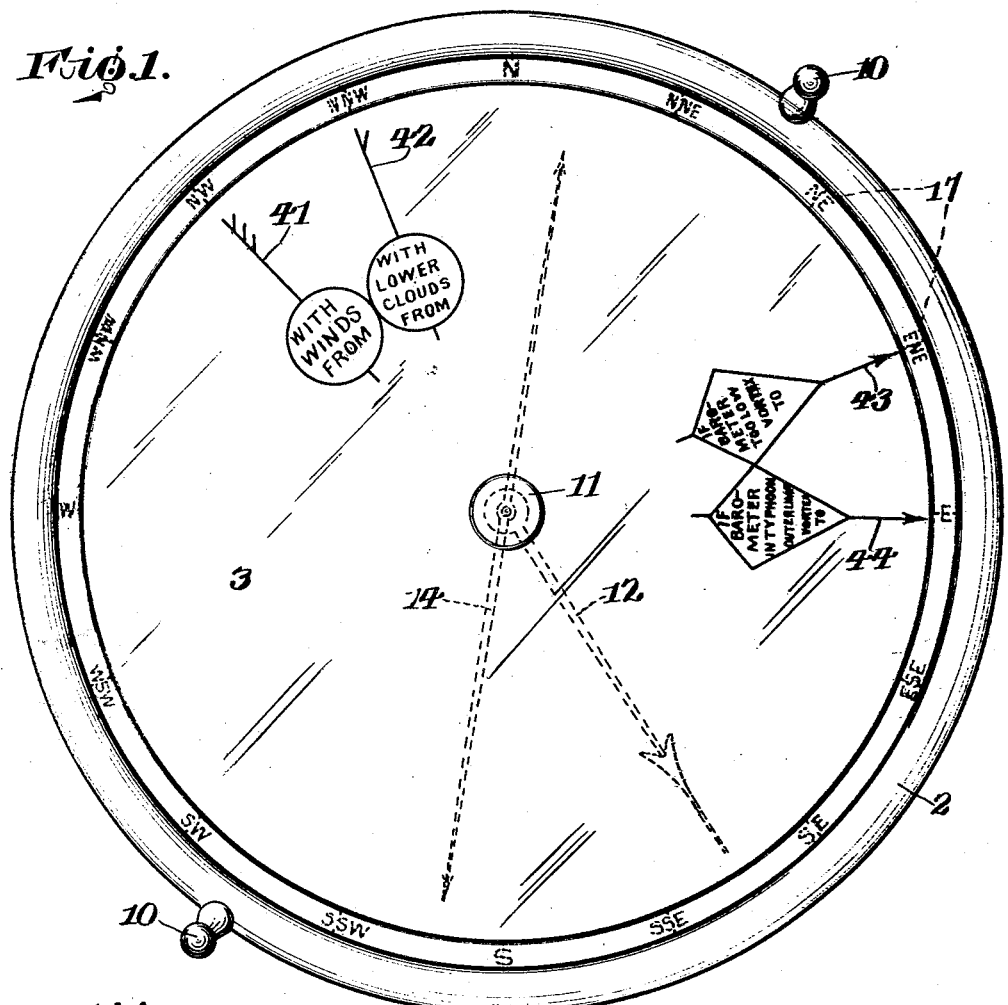
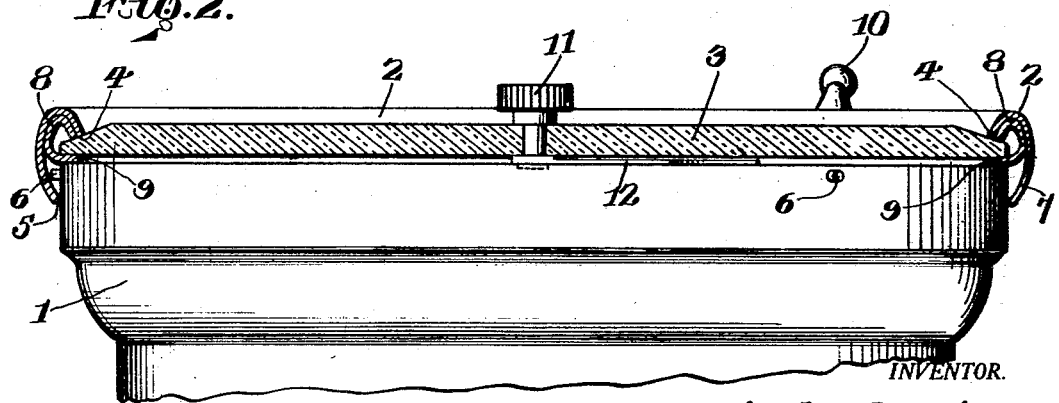
INVENTOR.
Alejandro Anareta,
BY
Geo. F. Kimmel
ATTORNEY.

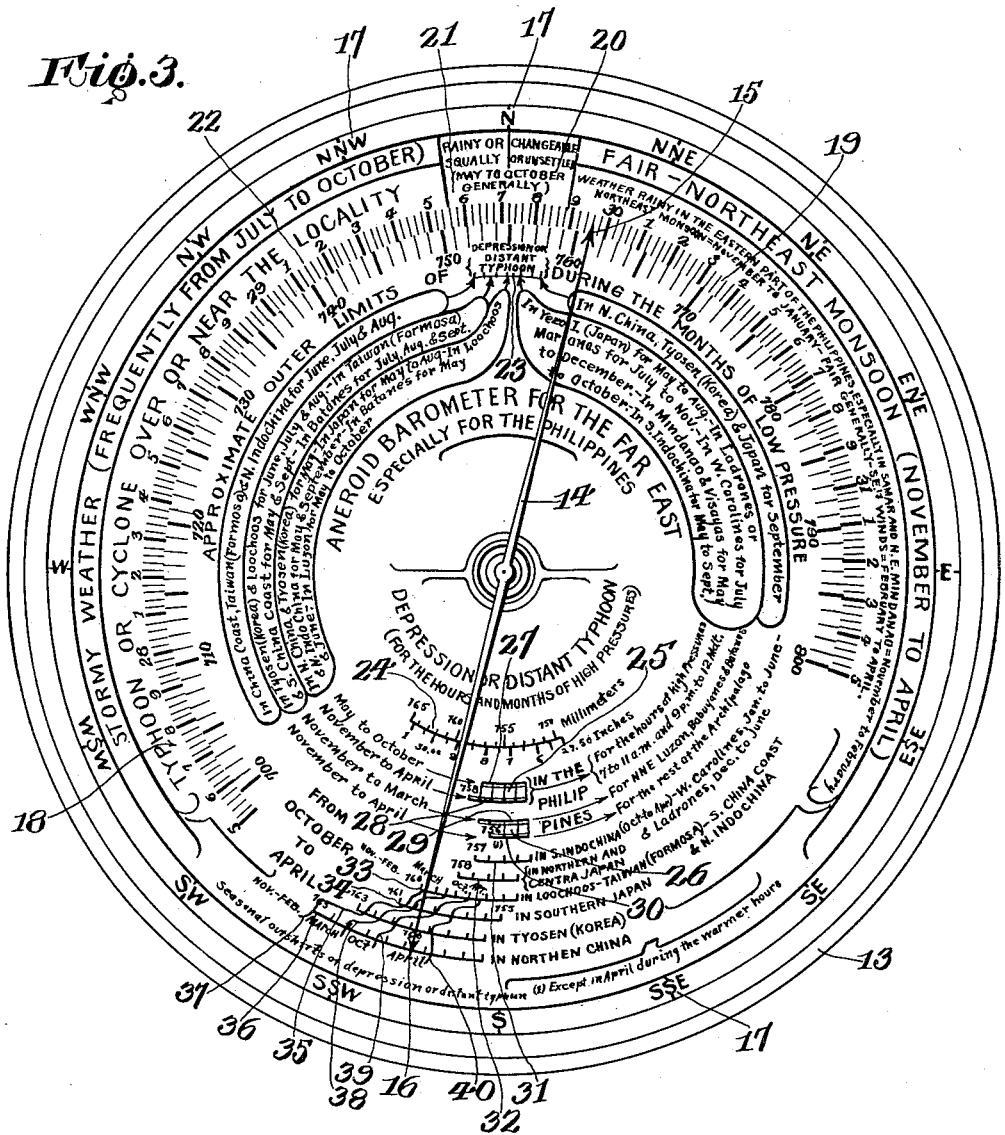

Patented July 25, 1933

1,920,048

UNITED STATES PATENT OFFICE

ALEJANDRO ANARETA, OF MANILA, PHILIPPINE ISLANDS

COMBINED TYPHOONOSCOPE AND BAROMETER

Application filed August 21, 1928. Serial No. 301,001.

This invention relates to a combined typhoonoscope and barometer and has for its primary object to provide, in a manner as hereinafter set forth, an instrument by means of which barometrical readings may be taken, and in connection therewith the direction may be determined of the vortex of any typhoon, the outer limits of which embrace the point of observation.

A further object of the invention is to provide an instrument of the class above mentioned including as a part thereof a rotatable, transparent cover for the dial of the instrument, said cover being provided with angularly disposed arrows to indicate the angles formed by the directions of the wind and lower clouds at the point of observation with the direction of the vortex of any typhoon, the outer limits of which embrace said point of observation.

A further object of the invention is to provide an instrument of the class above mentioned including as a part thereof, a dial for indicating the atmospheric pressure at the point of observation and also for indicating when said point of observation falls within the outer limits of a distant typhoon.

A further object of the invention is to provide an instrument having a dial as aforesaid, said dial being formed in a manner to indicate the diurnal and nocturnal oscillations of the atmospheric pressure, and to further indicate the natural variation of the atmospheric pressure during different months of the year.

Other objects and advantages of the invention will be apparent during the course of the following description.

In the drawings in which like numerals are employed to designate like parts throughout the same.

Figure 1 is a face view of an aneroid barometer cover in accordance with this invention.

Figure 2 is a transverse section of a barometer embodying my invention.

Figure 3 is a face view of a barometer dial in accordance with this invention.

The barometer dial herewith illustrated and described is designed for use in the Far East, more particularly in the Philippines, but it is to be understood that changes might be made in the indicia thereon to adapt the same for use in any location desired, the calibrated scales being provided for the purpose of illustration and not for the purpose of limitation.

It is well known that the atmospheric pressure presents every twenty-four hours a double oscillation, attaining two maxima and two minima. The former occurs during the late morning and evening and the latter during the early afternoon and morning. It is also well known that the normal atmospheric pressure varies in any latitude according to the different months of the year. In the Philippines and the whole Far East, the mean atmospheric pressure has two well defined periods during the year, one of high pressure and another of low pressure.

In the Philippines, the atmospheric pressure is normally higher than the annual mean during the months from November to April and normally lower than the annual mean during the months from May to October, the difference between the two extremes being approximately four mm. In China, Tyosen (Korea), Japan, and Taiwan (Formosa), the period of high pressure begins in October and the approximate difference between the high and low extremes for north China is about 17 mm., for Tyosen, 12 mm., for Japan, 6 mm., and for South China and Taiwan, 11 mm.

The atmospheric pressure being variable during the course of a day and during the course of a year and also according to different localities, it is essential that a barometer for use under such varied conditions, in order to accurately register the variations of the weather, should be calibrated to the different hours of the day, different months of the year, and to different localities. In order to accurately register the variations of the weather under the conditions as above outlined and to render the reading of the same sufficiently simple to be of practical use to agriculturists, fishermen, and the like, whose interests are exposed to the elements I employ a specially designed dial for an aneroid barometer, said dial being calibrated for use in connection with the upper end of a barometer needle and also being calibrated for use in connection with the lower end of said needle. The readings are taken at the lower end of the needle for different localities during the high pressure periods, and also for the periods of greater diurnal and nocturnal oscillations in the Philippines.

Referring now in detail to the drawings, the numeral 1 designates an aneroid barometer, the interior of which is of well known construction and forms no part of this invention. Rotatably mounted on the body of the instrument is a frame 2 for the transparent cover 3, which is preferably formed of plate glass. The frame 2 has one edge 4 thereof bent inwardly to seat on the outer face of the cover 3 and has its opposite edge 5 bent inwardly a lesser degree to seat against the peripheral face of the body of the instrument. The frame 2 is held in position by means of a plurality of pins 6 which project outwardly from the peripheral face of the body of the instrument into light contact with the inner face of the frame 2 at points spaced from the edge 5 thereof. For positioning the frame 2 relative to the pins 6, a slot 7 is formed transversely thereof which extends from the edge 5 and through which the pins 6 may be successively slipped. Secured to the inner face of the frame 2 is a plurality of clips 8, each of which conforms in contour with the frame 2 for a portion of its length and has one end resting on the outer face of the cover 3. The opposite end of each clip 8 is bent laterally from the frame 2 in the nature of a flange 9 and is disposed with its upper face bearing against the inner face of the cover 3 and with its lower face seated on the dial face of the instrument. The frame 2 is provided with a pair of handle members 10 for the ready manipulation thereof. The cover 3 has secured thereto by means of a friction button 11, an auxiliary needle 12 which is common in instruments of this character and forms no part of the present invention.

Disposed beneath the cover 3 is a dial plate 13 which is provided with suitable indicia to be hereinafter more particularly described, and to be read in connection with the movements of the barometer needle 14. The needle 14 is formed with arrow heads at its upper and lower ends which are designated by the numerals 15 and 16 respectively.

Disposed circumferentially of the face of the dial 13 adjacent the outer edge thereof, are the sixteen principal points of the windrose, said points being designated collectively by the numeral 17. Spaced inwardly from the points 17 is a scale indicated generally at 18, which extends in an arc about the dial 13 for a distance approximately 330 degrees. The scale 18 is graduated from 700 to 800 mm. and from 27½ to 31½ in inches. The upper end 15 of the needle 14 rides over the scale 18, and a portion of said scale, extending from 759 mm. to the upper end thereof is marked to indicate normal weather conditions in the Philippines during the months from November to April. Said portion is designated by the numeral 19.

Bordering the portion 19 is a portion 20, which extends from 755 mm. to 759 mm. and is marked to indicate changeable unsettled weather conditions for the Philippines during the months from May to October. Bordering the portion 20 and extending from 751 mm. to 755 mm. is a portion 21, which is marked to indicate normal pressure during rains or squalls. Bordering the portion 21 is a portion 22, which extends from 751 mm. to the lower end of the scale 18 and is marked to indicate typhoon or cyclone near the locality whenever the point 15 of the needle 14 descends thereto at any time.

A portion 23 of the scale 18, which extends from 752 mm. to 758 mm. is marked to indicate a distant typhoon for certain localities in the Far East during certain periods of the year. Suitable indicia is inscribed on the face of the dial 13 to designate the localities and months for which the portion 23 is applicable in connection with the movement of the point 15 of the needle 14. The portion 23 indicates generally the outer limits of pressure during which one of the designated localities may fall within the limits of a distant typhoon.

On the opposite side of the pivoted point of the needle 14 from the portion 23 and spaced from the pivoted point is a scale quadrant 24 which is graduated from 750 to 765 in mms. and from 29.5 to 30.1 in inches. The purpose of the quadrant 24 is to facilitate the reading in mms. or inches of any pressure indicated by the lower end of the needle designated by the point 16.

Spaced outwardly from the quadrant 24, for reading in connection with the lower end of the needle 14, is a pair of quadrants, 25 and 26 respectively, for the Philippines. The quadrant 25 is for use during the hours of greater diurnal and nocturnal oscillations and is so indicated by suitable indicia inscribed on the face of the dial 13 adjacent the quadrant. The quadrant 25 is divided into two scales, one of which is calibrated between 753 mm. and 757 mm. and is applicable for the months from May to October. This scale is designated by the numeral 27. The other scale, which is designated by the numeral 28, is calibrated between 753 mm. and 758 mm. and is applicable during the months from November to April. The quadrant 26 is divided into two scales designated respectively by the numerals 29 and 30. The scale 29 is calibrated from 753 mm. to 757 mm. and is for use in certain localities during certain months as indicated by suitable indicia on the face of the dial. The other scale 30 is for use in certain other localities during certain months as indicated on the face of the dial.

Disposed between the quadrant 26 and the arc described by the point 16 of the needle 14 is a plurality of single scale quadrants, six in all and designated respectively by the numerals 31, 32, 33, 34, 35 and 36. Each of the single scale quadrants is independently calibrated in mms. and is for use in a certain locality during certain months, all as indicated by suitable indicia on the face of the dial. In the localities for which the quadrants 33, 34, 35, and 36 are used, the outer typhoon limit varies according to months from October to April. Such limits are indicated by a plurality of irregular lines which cross each of said quadrants. One of said lines is applicable during the months from November to February and is designated by the numeral 37. The other lines are designated respectively by the numerals 38, 39 and 40 and are applicable during the months of March, October, and April respectively.

Inscribed on the face of the cover 3 is a pair of radially extending arrows designated respectively by the numerals 41 and 42. Associated with the arrow 41 is the inscription "with winds from" and associated with the arrow 42 is the inscription "with lower clouds from". The arrow 42 is spaced from the arrow 41 in a clockwise direction to form an angle of 22½ degrees.

Spaced 90 and 112½ degrees respectively from the arrow 42 in a clockwise direction is another pair of arrows which are designated respectively by the numerals 43 and 44. Associated with the arrow 43 is the inscription "if barometer too low, vortex to" and associated with the arrow 44 is the inscription "if barometer in typhoon outer limit, vortex to." The direction of the arrow 41 forms with the directions of the arrows 43 and 44, angles of 112½ degrees and 135 degrees respectively.

It is well known that the direction of the wind forms with the direction of the vortex of a typhoon, an angle of more than 90 degrees, the degree of the angle varying according to the distance of the typhoon from the point of observation. The extremes of this angle are approximately supposed in the typhoonoscope 135 degrees when the pressure is in the outer limit of the typhoon or the typhoon relatively distant, and 112½ degrees when the pressure is relatively low or the typhoon is already near the locality. The direction of the lower clouds should form an angle of 22½ degrees with the direction of the prevailing wind so when the cover 3 is rotated to point the arrow 41 to the direction of the wind, the arrow 42 should point to the direction of the lower clouds unless the observation is being affected by some condition foreign to the typhoon.

By so rotating the cover 3, the angle between the arrows 43 and 44 will automatically face the direction of the typhoon vortex and the approximately exact position of the vortex may be determined by referring to the barometrical reading of the instrument. The geographical position of the vortex is automatically shown by the positions of the arrows 41, 42, 43 and 44 relative to the points of the windrose 17.

In the use of my combined barometer and typhoonoscope, the instrument should be installed and tested in comparison with a mercurial barometer and any needed adjustments of the instrument made. Readings should be taken from both ends of the pointer 14 according to the indicia appearing on the face of the dial by means of which the variations in the mean pressure for different localities and for different months and hours of the day are indicated.

The quadrants over which the lower end of the needle passes represent the extreme isobars of a distant typhoon when read in accordance with the indicia appearing on the face of the dial. When the lower end of the needle moves beyond the lower graduations of said quadrants, it is an indication that the typhoon is no longer distant but is already approaching the locality.

It is to be understood that the form of my invention herewith shown and described is to be taken as a preferred example of the same and that various changes in the size, shape and arrangement of parts may be resorted to without departing from the spirit of the invention or the scope of the appended claim.

What I claim is:—

In a typhoonoscope, a barometer including a casing and an indicator therefor, said casing including a rotatable transparent cover through which the indicator may be observed, there being indicia representing the cardinal points exposed through said cover, said casing adapted to be oriented to position said indicia to correspond to the true cardinal directions, said cover being provided with means adapted to be brought into registry with the direction of approach of the prevailing wind, said cover being further provided with direction indicating means bearing a constant relationship to said wind direction indication means and coacting therewith for indicating possible maximum and minimum angles, in accordance with barometric pressure indications of said indicator within certain limits, of the direction of the vortex with respect to the direction of approach of the prevailing wind.

ALEJANDRO ANARETA.